United States Patent
Apparao et al.

(10) Patent No.: US 8,009,821 B1
(45) Date of Patent: Aug. 30, 2011

(54) STORES AS CALL CENTER RESOURCES

(75) Inventors: Vidur Apparao, San Francisco, CA (US); Richard Potts, Palo Alto, CA (US); Scott Lewis, Sunnyvale, CA (US); Beth McKinnon, San Carlos, CA (US); Christopher R. Waterson, South Lake Tahoe, CA (US)

(73) Assignee: LiveOps. Inc., Santa Clara, CA (US)

( * ) Notice: Subject to any disclaimer, the term of this patent is extended or adjusted under 35 U.S.C. 154(b) by 1280 days.

(21) Appl. No.: 11/646,058

(22) Filed: Dec. 27, 2006

(51) Int. Cl.
*H04M 3/523* (2006.01)
(52) U.S. Cl. .......... 379/265.01; 379/265.11; 379/266.09
(58) Field of Classification Search ............. 379/265.01, 379/265.02, 265.11, 266.09
See application file for complete search history.

(56) References Cited

U.S. PATENT DOCUMENTS 6,661,882 B1 * 12/2003 Muir et al. ............... 379/127.01
7,349,535 B2 * 3/2008 Shaffer et al. ............ 379/265.11

OTHER PUBLICATIONS

U.S. Appl. No. 10/886,333, Off. Action, Everingham et al., OA mailed Oct. 15, 2007.
U.S. Appl. No. 10/886,333, filed Jun. 5, 2008, Everingham et al., Notice of Allowance.

\* cited by examiner

*Primary Examiner* — Harry Hong
(74) *Attorney, Agent, or Firm* — PatentEsque Law Group LLP

(57) ABSTRACT

An exemplary method of integrating existing physical stores in call center operations comprises registering a plurality of physical stores each having at least one phone line, obtaining availability information of one or more phone lines of a registered store, determining a phone line to route a call for the registered store based on call center routing rules, and routing the call to the determined phone line.

23 Claims, 4 Drawing Sheets

STORES AS CALL CENTER RESOURCES

BACKGROUND

Call centers generally function to assist people seeking a product or a service. Calls to a call center may come from the traditional telephone network (e.g., the POTS) or via voice over IP (i.e., VOIP). Calls received from the POTS can be translated to VOIP calls at a media gateway. VOIP calls may also be referred to as IP calls. IP calls directed to a particular telephone number can generally bypass a media gateway and be forwarded directly to a soft switch or an automatic call director. An automatic call director generally functions to direct calls to different resources within the call center (e.g., an interactive voice response system, an agent, etc.).

Many companies have engaged call centers to handle their calls. Some of these companies have physical stores (e.g., retail locations, restaurants, factories, etc.) with existing phone lines for conducting business (e.g., receiving customer calls, making outbound calls, etc.). Traditionally, a call to a published number for a company's store is first routed to an existing phone line at the store. When the call is unanswered at the store (or otherwise forwarded from the store), the call is then forwarded to a remote call center sometimes operated by a third party engaged by the company. Calls arriving at a call center are typically answered by the next available agent. The physical stores of the companies are generally not treated as additional resources by the call centers engaged by the companies.

Thus, it would be beneficial to integrate existing phone lines at physical stores (and the stores) as additional resources to a call center for call routing.

SUMMARY

An exemplary method of integrating existing physical stores in call center operations comprises registering a plurality of physical stores each having at least one phone line, obtaining availability information of one or more phone lines of a registered store, determining a phone line to route a call for the registered store based on call center routing rules, and routing the call to the determined phone line.

An exemplary call center comprises a call manager and a plurality of resources accessible by the call manager for intelligently routing calls received by the call manager. The resources include a plurality of phone lines corresponding to registered physical stores. The call manager is configured to select a resource for routing a call for a registered store based on at least an attribute-based call center routing rule.

DETAILED DESCRIPTION

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

I. Overview

Section II describes an exemplary system for integrating physical stores as additional resources in a call center.

Section III describes an exemplary process for integrating physical stores as additional resources in a call center.

Section IV describes exemplary processes for registering physical stores and for routing a call based on resource availability.

Section V describes exemplary call center routing rules.

Section VI describes an exemplary operating environment.

II. An Exemplary System

Figure 1:
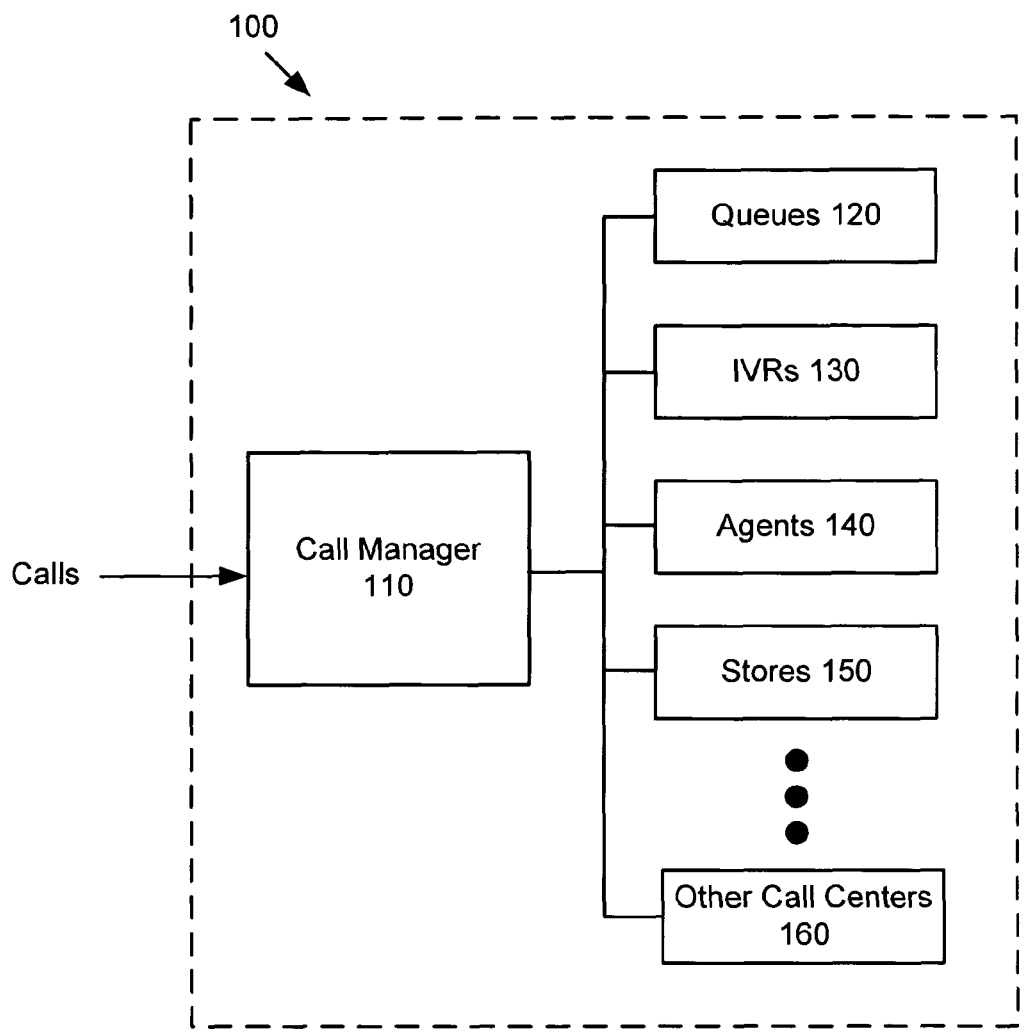
FIG. 1 illustrates an exemplary system for integrating existing physical stores in call center operations.

FIG. 1 illustrates an exemplary call center 100 for routing calls. The exemplary call center 100 includes a call manager 110 and multiple resources. In an exemplary implementation, the call manager 110 may be a soft switch or an automatic call director. Depending on call center routing rules applicable to each call, the call manager 110 can intelligently route the call to any one (or more) of the resources. For example, a particular dialed telephone number may trigger the call manager 110 to route the call to a specific pool of agents or activate a specific processing unit. Exemplary call center routing rules will be described in more detail in Section V below. In an exemplary implementation, the resources may include, without limitation, queues 120, interactive voice response units (IVRs) 130, agents 140, stores 150, other call centers 160, and/or other resources capable of handling calls.

The queues 120 can hold incoming calls until another resource is available to handle the call. For example, if all the agents are currently busy, a call may be put into a queue until an agent is available to take the call. In this example, when an appropriate agent becomes available, the call manager 110 may remove the call from the queue and route the call to the available agent 140.

The IVRs 130 are automated systems that, depending on configuration, may be capable of performing a myriad of functions. For example, an IVR may be configured to guide a caller to a proper destination, take orders, process payments, receive information, and/or perform other functions, singly or in combination.

Agents 140 are generally humans who have pre-registered with the call center 100 and are able to take calls in real time. Groups of agents may be located at one or more physical locations. Alternatively or in combination, individual agents may be distributed in different locations (e.g., agents may work from home). In general, each agent of the call center can be assigned a dedicated phone number for a given session of work. Alternatively or in combination, each agent may be uniquely identifiable by the call center 100 using any identification technologies known in the art.

Stores 150 are physical locations (e.g., retail stores, restaurants, factories, etc.) each having at least one existing phone line. Each phone line is generally associated with a phone number. Calls to each phone line (e.g., by dialing its associated phone number) may come from the traditional telephone network (e.g., the POTS) or via voice over IP (i.e., VOIP). The phone lines of each store are resources to the call center 100. The call manager 110 can route calls to the phone lines depending on call center routing rules. For example, one of the stores may be a pizza restaurant that has three pre-existing phone lines for taking orders from customers. These phone lines can be integrated into the call center 100 as resources of the call center 100. Section III below will describe exemplary processes for integrating physical stores as resources in the call center 100. In an exemplary implementation, each phone line may be treated as an agent by the call center. For example, each phone line may have attributes and/or performance metrics associated with it similar to ones associated with agents.

Each store can also be a separate resource to the call center 100. For example, multiple phone lines of a store may appear as a pool of phone lines to the call center 100. When the call center 100 determines that the store is the optimal resource for receiving a call (based on call center routing rules), the call center 100 may select any phone line from the pool of phone lines to route the call. Alternatively or in combination, the call center 100 may route the call to a "primary" phone line of the store, and the store may have the capability to determine which specific phone line should receive the call.

Other call centers 160 may each include its own call manager and other resources (not shown) similar to the ones available to the call center 100. Depending on call center routing rules, the call manager 110 may route a call to another call center 160.

III. An Exemplary Process for Integrating Physical Stores in a Call Center

Figure 2:
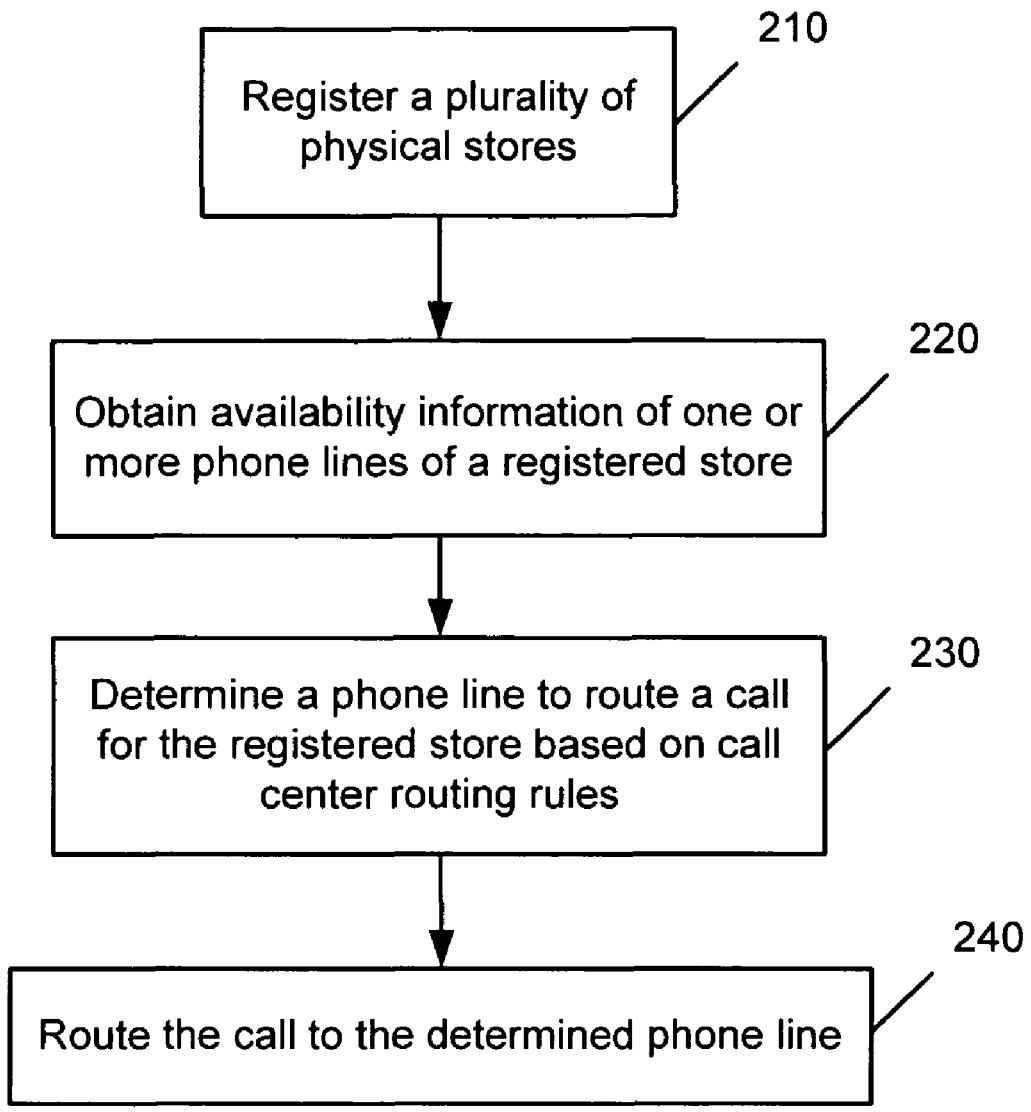
FIG. 2 illustrates an exemplary process for integrating existing physical stores in call center operations.

FIG. 2 illustrates an exemplary process for integrating physical stores in a call center.

At step 210, a call center 100 registers a plurality of physical stores. In an exemplary implementation, each physical store has at least one pre-existing phone line. In another exemplary implementation, one or more phone lines may be assigned to each store at registration. During registration, information about each store is stored in a database accessible to the call center 100. An exemplary registration process will be described in Section IV with reference to FIG. 3.

At step 220, the call center obtains availability information of one or more phone lines of each registered store. A phone line of a registered store may be present but not available to receive calls. A phone line may be placed into a pool of present resources (e.g., during business hours of the store). However, if an employee at the store is using the phone line to make an outbound call, then that line may be temporarily unable to receive inbound calls. Depending on specific implementation and design choice, availability information may include whether a phone line is present as a resource and may or may not include whether the phone line is able to receive a call. An exemplary process for routing calls based on availability information is described in Section IV with reference to FIG. 4.

At step 230, the call center determines a resource to route a call for the registered store based on call center routing rules. In an exemplary implementation, a caller may dial an existing published phone number of a store and the call is forwarded to the call center 100 via one or more carriers (e.g., local exchange carrier, long-haul carrier, network carrier, and/or other carriers). The call forwarding can be implemented using any known carrier call forwarding technologies. In another exemplary implementation, the call center 100 may create new phone numbers, associate the phone numbers with a store, and published the created phone numbers. In this implementation, an inbound call caused by a caller dialing a call center created phone number can be forwarded to the call center 100 without involving the existing local exchange carrier for the store. In yet another implementation, a caller may dial a separate phone number (i.e., not necessarily associated with a single store) hosted by the call center 100. In this implementation, the call is forwarded to the call center 100 via one or more carriers. Regardless of how the call is forwarded (or otherwise routed) to the call center 100, the call center 100 determines where to route each received call (i.e., which resource) based on call center routing rules.

In an exemplary implementation, the selected resource is a phone line of the registered store and the phone line is present as a resource to the call center 100. Depending on applicable call center routing rules, the call could be routed to any resource accessible to the call center 100 (e.g., a queue 120, an IVR 130, an agent 140, another phone line of the store, another phone line of another store, another call center 160, etc.). A call for any particular registered store is not necessarily routed to a phone line of that store. Call center routing rules may be pre-determined, dynamically modified, and/or a combination thereof. Exemplary call center routing rules and their implementations will be described in more detail in Section V.

At step 240, the call manager 110 routes the call to the determined resource. In an exemplary implementation, the determined resource is a phone line of the registered store. In one implementation, the call is routed to the selected resource regardless of whether the call manager 110 has knowledge of the resource's availability. In another implementation, the call manager 110 determines (or otherwise has knowledge of) whether the selected resource is available prior to routing the call to the resource.

The exemplary process described above is merely illustrative. One skilled in the art will recognize that other process steps may be implemented in addition to (or as a substitution of) the described steps for integrating phone lines at physical stores in call center operations.

IV. Exemplary Registration and Routing Processes

Figure 3:
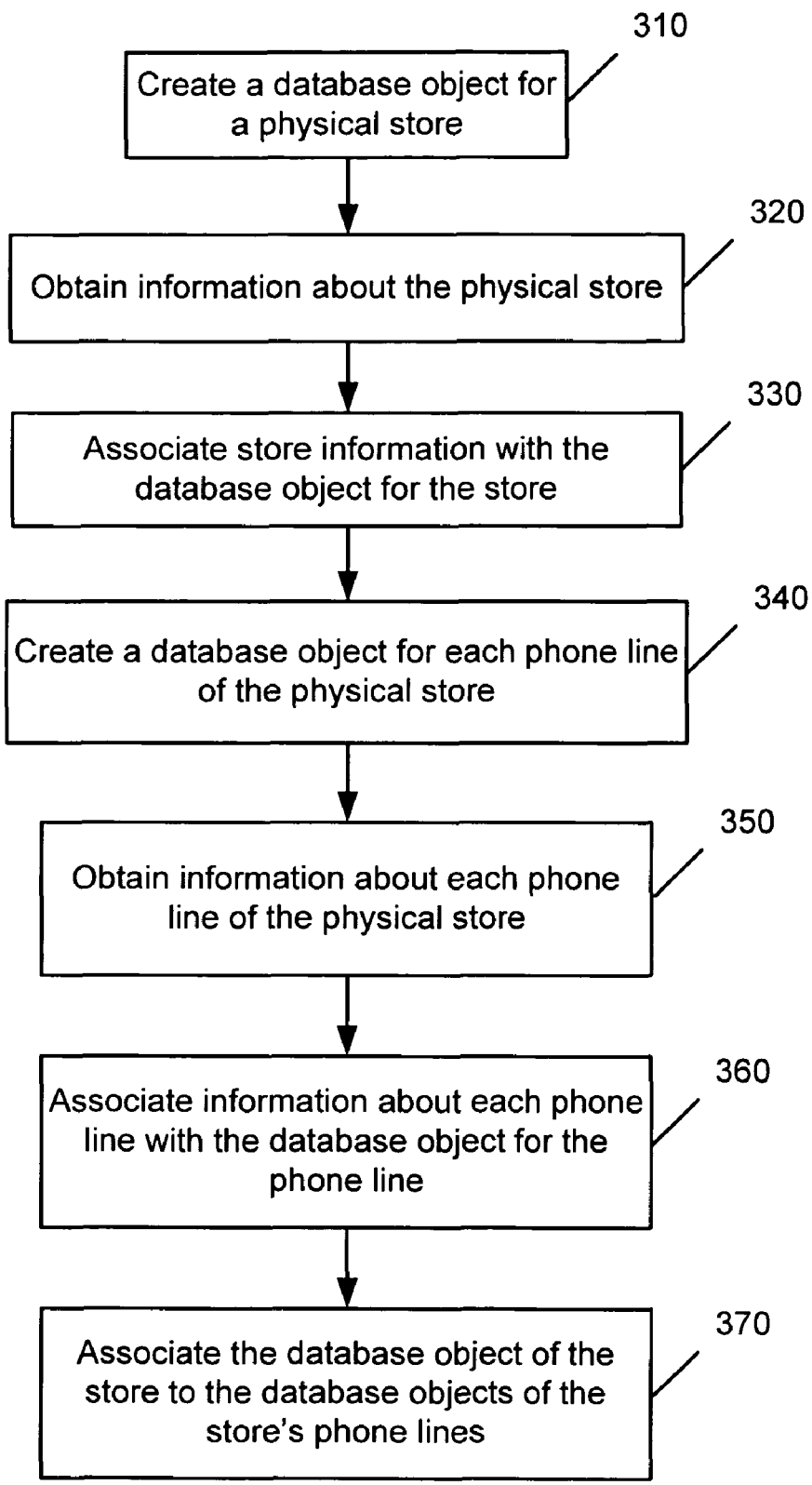
FIG. 3 illustrates an exemplary registration process.

FIG. 3 illustrates an exemplary process for registering physical stores to integrate the stores in a call center 100. In an exemplary implementation, a web-based registration system can be used wherein stores may register by filling out an electronic form at a specific web page. Other mechanisms for data collection (e.g., non-web based) may be implemented to facilitate the registration process.

At step 310, a database object is created for a physical store. In an exemplary implementation, the database can be implemented as a relational database, an object-relational database, a flat file database, and/or other suitable databases.

At step 320, information of the physical store is obtained. Information may include, without limitation, global attributes of the physical store. Global attributes are attributes that apply to some or all phone lines of the store. Global attributes may include, without limitation, business hours, physical address, and/or other global information relating to the store.

At step 330, information of the store is associated with the database object of the store. Any known database mapping technology may be used for implementing the association. Information of the store may be modified, deleted, and/or added at any time and updated in the store's object.

At step 340, a database object is created for each phone line of the physical store.

At step 350, information of a phone line is obtained. Information may include, without limitation, specific attributes for the phone line. Specific attributes of a phone line may include, without limitation, employee capacity, employee capability (e.g., ability to speak foreign languages), employee skills, employee past performance, and/or other information.

At step 360, information of a phone line is associated with the database object of the phone line. Information of a phone line may be modified, deleted, and/or added at any time and updated in the phone line's object.

At step 370, the database object of the store is associated with the database objects of the store's phone lines.

Once the phone lines of a physical store have been registered, each phone line (and the registered store) becomes a resource of the call center 100. In an exemplary implementation, each phone line may be enabled to perform various telephony functions by communicating directly with the call manager 110 using a telephone touchpad or using other data recognition technologies known in the art (e.g., automatic speech recognition). For example, an employee using the phone line may send a (predetermined) DTMF tone to the call manager 110 to affect a call transfer.

The call manager 110 can generally route a call to a resource (e.g., a phone line) that is known to be present. The knowledge of whether a resource is present can be acquired by the call manager 110 via different mechanisms. For example, in an exemplary implementation, explicit notification may be required to inform the call manager 110 regarding a phone line's presence as a resource (e.g., by dialing in and/or logging in). In another exemplary implementation, a phone line may be automatically present during a specific and/or recurring time interval. For example, all phone lines of a registered store may be automatically present during business hours. In yet another implementation, the presence of each resource may be determined by the call manager 110 based on predetermined and/or dynamically changing rules (e.g., phone lines are always present during business hours except during Monday holidays, phone lines are considered present only after the system has determined that the phone line is working, etc.). Alternatively or in combination, the call manager 110 may have access to a store's intra-network, an external scheduling system, and/or other systems for gaining presence information of the store's phone lines. One skilled in the art will recognize that other methods may be implemented depending on design choice.

A present phone line may not be available to receive calls. For example, if an employee uses the phone line to make an outbound call then the line can be temporarily unavailable until the outbound call is terminated. In an exemplary implementation, the call manager 110 may have knowledge that a present phone line is currently unavailable before routing a call to the phone line. In this implementation, the call manager 110 will not select that phone line for routing the call. In another exemplary implementation, the call manager 110 may route a call to a present phone line without knowledge of its availability. If the phone line happens to be unavailable, the call manager 110 then determines another resource to route the call.

When the call manager 110 gains knowledge that a present resource is unavailable, the call manager may temporarily place the unavailable resource on hold (or "pause" the resource). Depending on design choice, the resource may remain on hold until the call manager 110 is notified that the resource is again available. Alternatively or in combination, the resource may revert back to the pool of present resources after being on hold for a period of time. One skilled in the art will recognize that other rules and/or mechanisms may be implemented as an alternative or in combination to effect the toggling of a resource between pause and un-pause modes.

Figure 4:
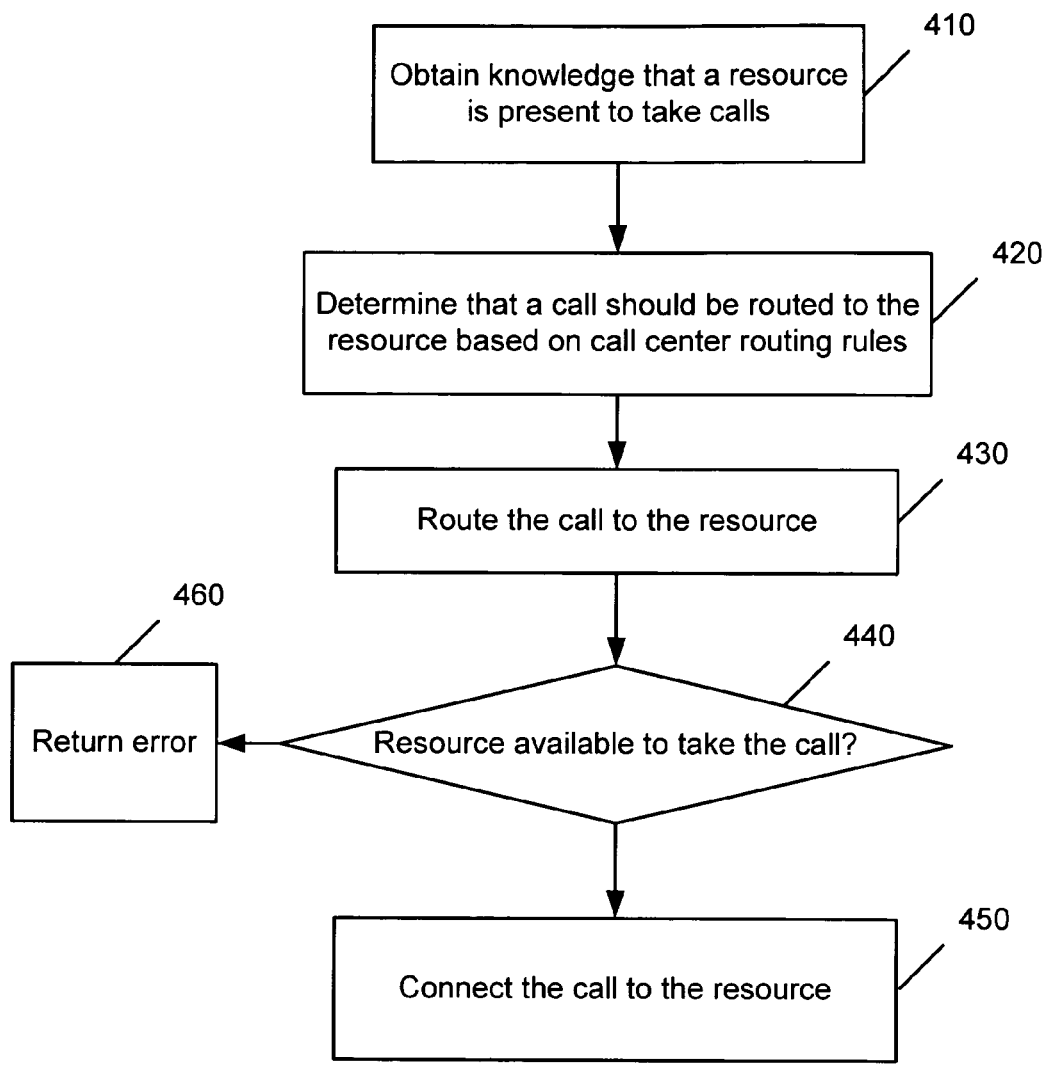
FIG. 4 illustrates an exemplary process for routing a call based on resource availability.

FIG. 4 illustrates an exemplary process for routing a call based on resource availability.

At step 410, the call manager 110 has knowledge that a resource (e.g., a phone line) is present to take calls. For example, a resource may become present when a default event occurs (e.g., the start of a preset business hour, at a predetermined time of each business day, etc.).

At step 420, the call manager 110 determines that a call should be routed to a present resource based on call center routing rules. Exemplary call center routing rules will be described in more detail in Section V below.

At step 430, the call manager 110 routes the call to the resource.

At step 440, the call manager 110 determines whether the resource is available to take the call.

At step 450, if the resource is available, the call manager 110 connects the call to the resource (e.g., by establishing a call leg between the call and the resource).

At step 460, if the resource is unavailable, an error is returned to the call center. In an exemplary implementation, after receiving an error message, the call manager 110 determines another resource (e.g., phone line, agent, another call center, etc.) for routing the call based on call center routing rules.

V. Call Routing Rules

Each call received at the call center 100 can be routed to a different resource depending on call center routing rules. Call center routing rules may be one or more of (or a combination of) results-based rules, allocation-based rules, attribute-based rules, volume-based rules, and/or other rules.

Results-based rules include rules that automatically self update based on performance. For example, the top 10 percent of agents can dynamically change depending on calls and results in any specific time interval. In an exemplary implementation, a weighted results based algorithm may be used to include any desired result factors.

Allocation-based rules include rules that determine what percentage of calls should be routed to which pool of resources. For example, 50 percent of all calls to a store may be allocated to the phone lines of that store.

Attribute-based rules includes rules that determine where to route each call based on specific skills, performance, characteristics of each call, and/or attributes of each resource. For example, if the call center determines that the caller needs assistance by someone who can speak a certain foreign language, the call may be routed to a resource with that capability (e.g., an agent who can speak that language). In an exemplary implementation, the results-based rules may be considered as one type of attribute-based rules.

Volume-based rules include rules that determine what percentage of calls should be routed to each pool of resources based on the volume of calls already being routed to those resources. For example, when a store is already at 90% capacity, all subsequent calls may be routed elsewhere.

These rules and/or other rules may be applied singly or in combination with each other. Any particular hierarchy of these rules in application can be customer-dependent, time-dependent, predetermined by default, and/or otherwise customized statically or dynamically. In an exemplary implementation, any particular rules hierarchy can be implemented in a routing script, or any other technologies known in the art.

VI. Exemplary Operating Environments

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory.

The foregoing embodiments of the invention have been presented for purposes of illustration and description only. They are not intended to be exhaustive or to limit the invention to the forms disclosed. Accordingly, the scope of the invention is defined by the appended claims, not the preceding disclosure.

What is claimed is:

1. A computer-implemented method of integrating existing physical stores in call center operations, comprising steps performed by a computing device:
    (a) registering a plurality of physical stores each having at least one phone line;
    (b) obtaining availability information of one or more phone lines of a registered store;
    (c) determining a phone line to route a call for the registered store based on call center routing rules; and
    (d) routing said call to said determined phone line.

2. The method of claim 1, wherein said registering includes creating a database object for each phone line.

3. The method of claim 2, wherein said registering includes associating information about each phone line with its corresponding database object.

4. The method of claim 1, wherein said registering includes creating an association between a store and its one or more phone lines in a database.

5. The method of claim 1, further comprising enabling a phone line to perform telephony functions by directly communicating with a call manager.

6. The method of claim 1, wherein said obtaining includes:
    obtaining confirmation of presence information regarding a phone line; and
    determining whether said present phone line is available to receive calls.

7. The method of claim 1, wherein said obtaining includes:
    determining a phone line is not available to receive calls; and
    pausing said phone line to prevent calls from being routed to that line.

8. The method of claim 7, wherein the paused phone line is automatically un-paused after a period of time.

9. The method of claim 1, wherein said determined phone line is a phone line of said registered store.

10. The method of claim 1, wherein said determined phone line is not a phone line of said registered store.

11. A call center, comprising:
    a call manager; and
    a plurality of resources accessible by said call manager for intelligently routing calls received by said call manager;
    said resources including a plurality of phone lines corresponding to registered physical stores; and
    said call manager being configured to select a resource for routing a call for a registered store based on at least an attribute-based call center routing rule.

12. The call center of claim 11, further comprising a database accessible to said call manager, said database including an association between a store and its one or more phone lines.

13. The call center of claim 11, wherein a phone line corresponding to a registered store is enabled to perform telephony functions by directly communicating with said call manager.

14. The call center of claim 11, wherein said selected resource is not a phone line of said corresponding registered store.

15. The call center of claim 11, wherein if said selected resource is unavailable to receive said call, said call manager is further configured to select another resource for routing said call based on call center routing rules.

16. The call center of claim 11, wherein said resources include said registered physical stores.

17. The call center of claim 11, wherein at least one of said plurality of phone lines is being treated as an agent by said call center.

18. The call center of claim 11, wherein said attribute-based routing rule includes a results-based routing rule.

19. A non-transitory computer-readable medium for integrating phone lines of existing physical stores in call center operations, comprising logic instructions that, if executed:
    (a) register a plurality of physical stores each having at least one phone line;
    (b) obtain availability information of one or more phone lines of a registered store;
    (c) determine a phone line to route a call for the registered store based on call center routing rules; and
    (d) route said call to said determined phone line.

20. The computer-readable medium of claim 19, wherein said logic instructions for registering include logic instructions that, if executed: create an association between a store and its one or more phone lines in a database.

21. The computer-readable medium of claim 19, further comprising logic instructions that, if executed: enable a phone line to perform telephony functions by directly communicating with a call manager.

22. The computer-readable medium of claim 19, wherein said logic instruction for obtaining include logic instructions that, if executed:
    determine a phone line is not available to receive calls; and
    pause said phone line to prevent calls from being routed to that line.

23. The computer-readable medium of claim 19, wherein said determined phone line is not a phone line of said registered store.

* * * * *